(12) United States Patent
Ross

(10) Patent No.: US 7,875,202 B2
(45) Date of Patent: Jan. 25, 2011

(54) AIRCRAFT DE-/ANTI-ICER

(75) Inventor: Foster Ross, Haltwhistle (GB)

(73) Assignee: Kilfrost Limited, Haltwhistle, Northumberland (GB)

( * ) Notice: Subject to any disclaimer, the term of this patent is extended or adjusted under 35 U.S.C. 154(b) by 0 days.

(21) Appl. No.: 12/293,003

(22) PCT Filed: Mar. 15, 2007

(86) PCT No.: PCT/GB2007/000921

§ 371 (c)(1),
(2), (4) Date: Dec. 17, 2008

(87) PCT Pub. No.: WO2007/104996

PCT Pub. Date: Sep. 20, 2007

(65) Prior Publication Data

US 2009/0085004 A1    Apr. 2, 2009

(30) Foreign Application Priority Data

Mar. 15, 2006    (GB) .................. 0605235.1

(51) Int. Cl.
*C09K 3/18* (2006.01)
*B64D 15/00* (2006.01)
*B64D 15/06* (2006.01)
*B64D 15/10* (2006.01)
*B64F 5/00* (2006.01)

(52) U.S. Cl. ................. 252/70; 106/13; 244/134 R; 244/134 C

(58) Field of Classification Search .............. 106/13; 252/70; 244/134 R, 134 C
See application file for complete search history.

(56) References Cited

U.S. PATENT DOCUMENTS

| 4,358,389 A | 11/1982 | Konig-Lumer et al. |
| 4,744,913 A | 5/1988 | Salvador et al. |
| 5,334,323 A | 8/1994 | Schrimpf et al. |
| 5,718,834 A | 2/1998 | Pollmann et al. |
| 5,759,436 A | 6/1998 | Schrimpf et al. |
| 5,935,488 A | 8/1999 | Wiesenfeld et al. |
| 6,287,480 B1 | 9/2001 | Berglund et al. |
| 7,037,442 B2 * | 5/2006 | Jeschke et al. ............. 252/70 |
| 2004/0211937 A1 | 10/2004 | Jeschke et al. |

FOREIGN PATENT DOCUMENTS

| CA | 2133372 C | 4/1995 |
| DE | 3142059 A1 | 5/1983 |
| EP | 0586127 A1 | 3/1994 |
| JP | 10237428 A | 9/1998 |
| WO | 0000568 A | 1/2000 |

OTHER PUBLICATIONS

Anonymous, "Propylene Glycol based Heat-Transfer Fluids," Internet Article on URL.www.engineeringtoolbox.com/propylene-D_963.html.
Search Report for GB Application 0605235.1 dated Jul. 19, 2006.
Ritter, "Aircraft Deicers" Cenear, vol. 79, No. 1, pp. 30-32, Jan. 1, 2001.

* cited by examiner

*Primary Examiner*—Anthony J Green
(74) *Attorney, Agent, or Firm*—Rothwell, Figg, Ernst & Manbeck PC

(57) ABSTRACT

This invention relates to an aircraft de-/anti-icer for use at low temperatures. In particular, the present invention provides the use of a composition comprising 1,3-propylene glycol, one or more surfactants, one or more corrosion inhibitors, one or more pH regulators and water for removing frozen water from the surfaces of aircraft and/or for preventing the formation of frozen water thereon at a temperature below −32° C.

8 Claims, 3 Drawing Sheets

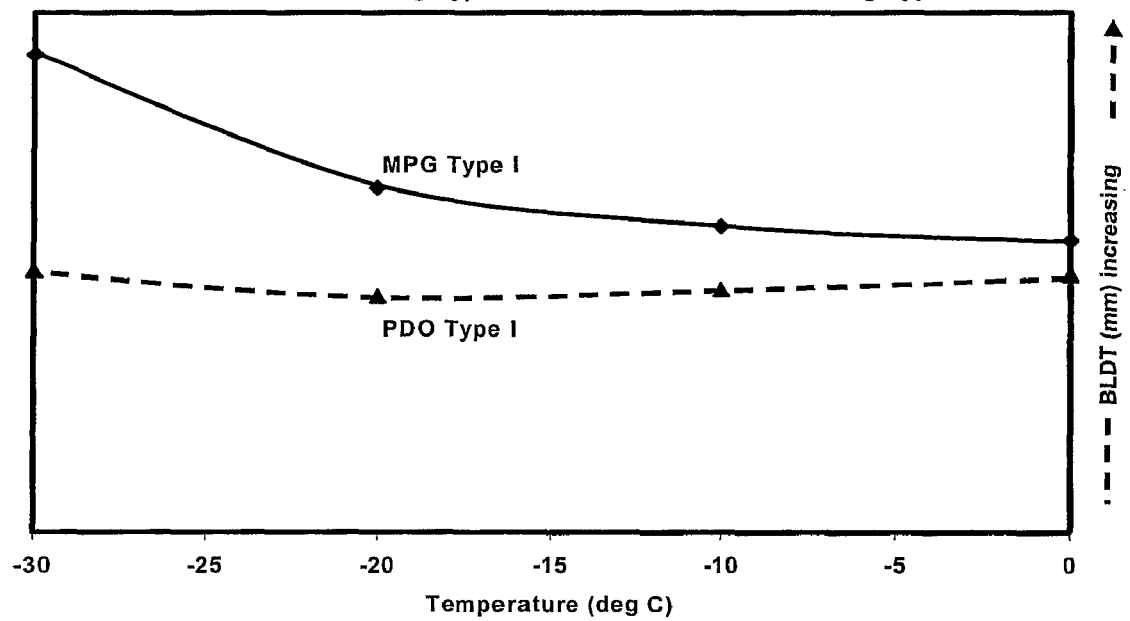
Figure 1 Comparison of BLDT values for PDO containing Type I fluid versus a MPG containing Type I fluid

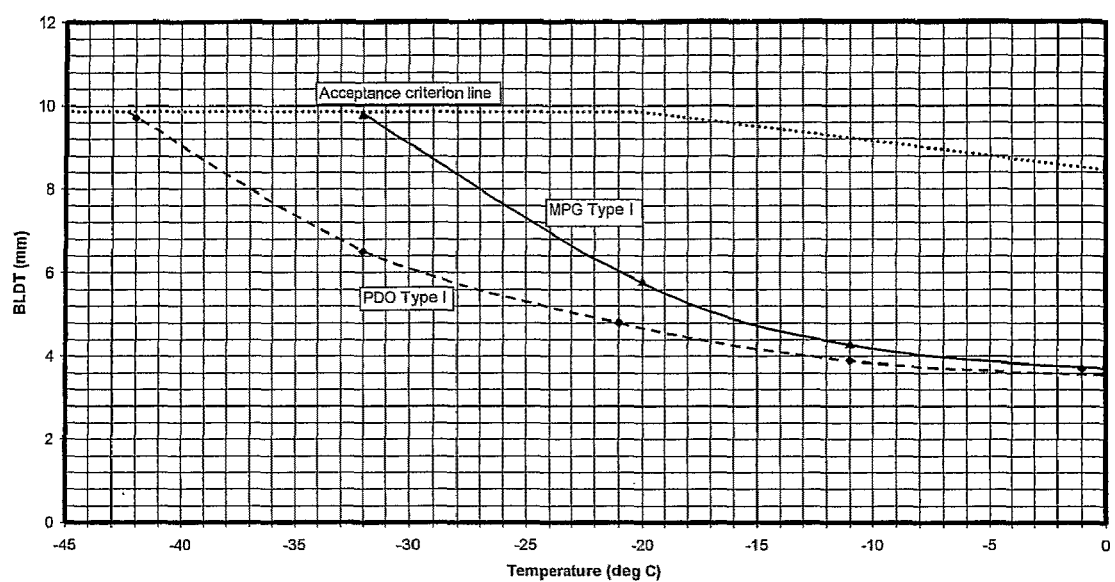
Figure 2 Comparison of BLDT values for a
PDO containing Type I fluid versus a MPG containing Type I fluid

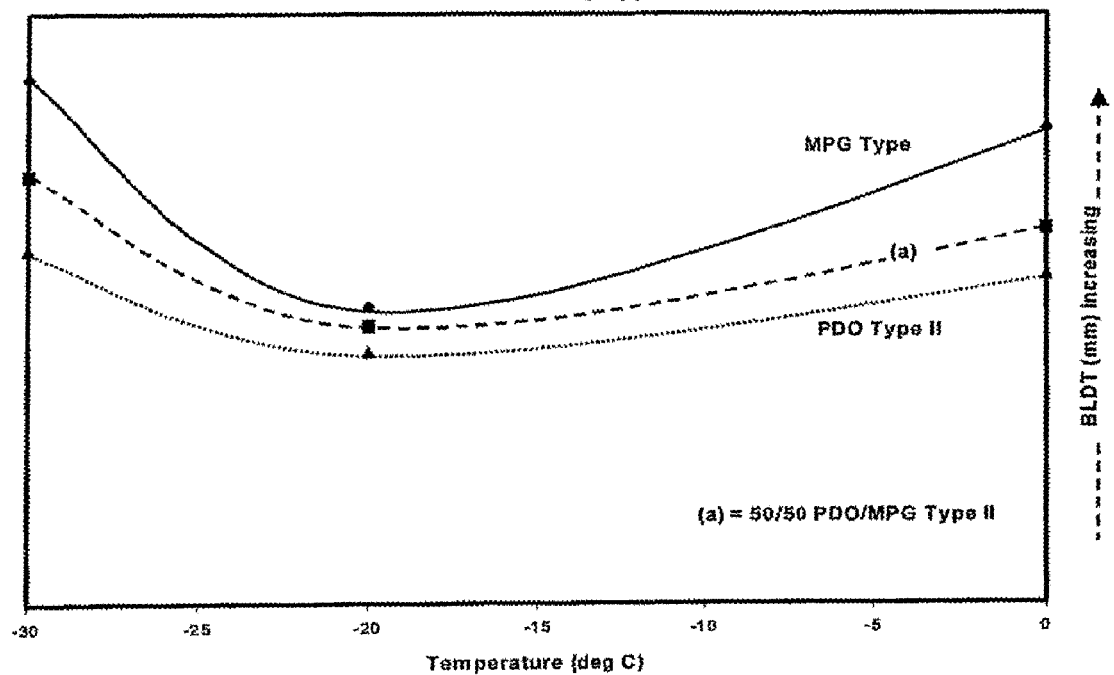
Figure 3  Comparison of BLDT values for PDO and MPG containing Type II Fluids

AIRCRAFT DE-/ANTI-ICER

This application is a 371 filing of PCT/GB2007/000921, filed Mar. 15, 2007 which claims priority from GB application 0605235.1, filed Mar. 15, 2006. These prior applications are incorporated herein by reference.

This invention relates to an aircraft de-/anti-icer and particularly to an aircraft de-/anti-icer for use at low temperatures.

By de-/anti-icer is meant a formulation which removes frozen water and/or prevents the formation of frozen water. Methods for the removal of frozen water (ice, snow, frost and the like) from surfaces, and for the prevention of their forming thereon, are well known in the art. In general, chemical compositions, so called de-/anti-icers, achieve this by depressing the freezing point of water. Simple de-/anti-icers include chloride salts, such as sodium, calcium or potassium.

A very important use of de-/anti-icers is found in the aviation industry, as build up of ice or snow on aircraft can be catastrophic. As a result, demands on aviation de-/anti-icers are particularly severe. The de-/anti-icer should remove the ice from the aircraft surfaces efficiently and prevent its reforming for as long as possible, and also flow efficiently from the aircraft during take-off so as not to impair the aerodynamic properties of the aircraft.

Use of inorganic and organic salts such as alkali metal chlorides and acetates respectively for this purpose is unacceptable, as these cause corrosion of metallic surfaces. Consequently, aqueous solutions of glycols, particularly ethylene glycol and 1,2-propylene glycol, have been utilised extensively.

De-/anti-icers are defined in terms of the "type" of fluid. Type I de-/anti-icers typically comprise either ethylene glycol or 1,2-propylene glycol, water, corrosion inhibitors, surfactants and pH regulators and usual avoid thickening agents. Spraying type I de-/anti-icers onto aircraft surfaces at temperatures of around 65-80° C. prior to take-off removes ice effectively (Chemical and Engineering News, Jan. 1, 2001, Volume 79, Number 1, p. 30). However, the period of time ice is prevented from re-forming by these de-/anti-icers (the holdover time) is short—tests by the AEA (Association of European Airlines) recommend holdover times of only 3 minutes for type I de-/anti-icers in conditions of freezing rain, and 20 minutes in conditions of frost formation (EP 0 646 634).

If a longer holdover time is required, a two-step de-icing process is often utilised, involving initial application of a type I de-/anti-icer as above, and subsequent application of a type II (or III or IV) de-/anti-icer. A type II (or III or IV) de-/anti-icer contains, in addition to glycol, water, surfactant, pH regulator and corrosion inhibitor, a thickening agent. This thickening agent improves the holdover time of the de-/anti-icer—tests by the AEA (Association of European Airlines) recommend holdover times of 30 minutes for type II de-/anti-icers in conditions of freezing rain, and 240 minutes in conditions of frost formation (EP 0 646 634).

A de-/anti-icer containing ethylene glycol may be used at temperatures as low as −40° C., as it still flows efficiently from the aircraft at these temperatures. However, because it is harmful to mammals (Sigma-Aldrich, Handbook of Chemicals and Laboratory Equipment), use of ethylene glycol is discouraged.

In consequence, the essentially harmless 1,2-propylene glycol is favoured as an aircraft de-/anti-icer. However, 1,2-propylene glycol can only be used as an aircraft de-/anti-icer down to temperatures of −32° C., as its viscosity at this temperature becomes so great that it no longer flows efficiently from the aircraft during take-off. Therefore 1,2-propylene glycol cannot be used as an aircraft de-/anti-icer in areas which experience extremely cold temperatures, i.e. those below −32° C. As a result, in regions which experience temperatures below −32° C. there has been no practical alternative to using toxic ethylene glycol-containing de-/anti-icers.

As a result, there remains a need for non-toxic de-icing fluids which can be used at very low temperatures.

BRIEF DESCRIPTION OF THE DRAWINGS

FIG. 1 is a graph showing relative boundary layer displacement thickness (BLDT) values of type I de-/anti-icers containing 1,3-propylene glycol (PDO) and 1,2-propylene glycol (MPG).

FIG. 2 is a graph showing relative boundary layer displacement thickness (BLDT) values of type I de-/anti-icers containing 1,3-propylene glycol (PDO) and 1,2-propylene glycol (MPG).

FIG. 3 is a graph showing the boundary layer displacement thickness (BLDT) values for type II de-/anti-icers containing 1,3-propylene glycol (PDO), 1,2-propylene glycol (MPG) and a 50/50 mixture of 1,3-propylene glycol and 1,2-propylene glycol.

DETAILED DESCRIPTION OF THE INVENTION

The present invention provides the use of a composition comprising 1,3-propylene glycol, one or more surfactants, one or more corrosion inhibitors, one or more pH regulators and water for removing frozen water from the surfaces of aircraft and/or preventing the formation of frozen water therein at a temperature below −32° C.

Surprisingly it has been found that, while 1,3-propylene glycol (also referred to as 1,3 propane diol or PDO) has benign toxicological properties similar to those of 1,2-propylene glycol (also referred to as 1,2 propane diol, mono propylene glycol or MPG), 1,3-propylene glycol can be used as an aircraft de-/anti-icer at low temperatures in the manner of ethylene glycol.

The present invention will now be described with reference to the accompanying drawings, in which FIGS. 1, 2 and 3 show relative boundary layer thickness displacement test readings for 1,3 propylene glycol and 1,2-propylene glycol based type I (FIGS. 1 and 2) and type II (FIG. 3) de-/anti-icing fluids respectively.

1,3-Propylene glycol is produced by either microbial or petrochemical processes and is commercially available, for example, bio-PDO from DuPont and Tate & Lyle, and Chargill, and petro-PDO from Shell. The 1,3-propylene glycol may be the sole glycol present or may be combined with other glycols, typically 1,2-propylene glycol. The 1,3-propylene glycol may also be combined with ethylene glycol and/or diethylene glycol but this is preferably avoided due to the toxicity of ethylene glycol and diethylene glycol. Preferably the 1,3-propylene glycol is present at at least 20%, more preferably at at least 40% more preferably at at least 60%, more preferably at at least 80% and most preferably at 100% based on the total amount of glycol present.

At least one of the one or more surfactants may be an anionic surfactant, for example an alkali metal alkyl aryl sulfonate, preferably a $C_{1-30}$ alkyl lauryl sulfonate with one or more sulfonate groups, particularly preferably a $C_{15-25}$ alkyl lauryl sulfonate with one or more sulfonate groups.

Alternatively, at least one of the one or more surfactants may be a non-ionic surfactant, preferably the polymer formed by reaction of a $C_{8-18}$ fatty alcohol with 1-15 equivalents of ethylene oxide and/or propylene oxide.

At least one of the one or more corrosion inhibitors may be an alkali metal phosphate, a lower alkyl phosphate, a triazole, an alkali metal silicate, an alkyl silicate or an alkali metal salt of a low molecular weight aromatic or alkyl carboxylic acid.

At least one of the one or more pH regulators may be an alkali metal hydroxide, such as NaOH and KOH; an alkylamine, such as ethylamine, propylamine, butylamine; an alkanol amine, such as mono-, di- and triethanolamine; or a mixture of inorganic and organic bases. Preferably the pH regulator is an alkali metal hydroxide.

Water is also present. Preferably the water is desalinated water.

The de-/anti-icer used in the present invention may be prepared by mixing the individual components together in any order. Mixing is preferably carried out in a vessel equipped with a stirrer.

As explained hereinabove a de-/anti-icer may be a type I or type II (or type III or IV) fluid depending on the requirements for the application. Type I fluids are used for the initial de-icing of the aircraft and are typically applied to the aircraft surfaces at temperatures of around 65-80° C. prior to take-off. However, the holdover time of type I fluids is short. Accordingly, type II (or type III or IV) are used where a longer holdover times are required. The disadvantage of such fluids is that they are difficult to remove and affect the aerodynamic properties of the aircraft. Type I fluids therefore tend not to contain thickening agents, although some type I fluids may contain thickening agents provided the de-icing properties and removal properties are not adversely affected. Type II, III and IV fluids will contain thickening agents.

Preferably the composition of the present invention is a type I de-/anti-icer. The term "type I" fluid is known in the art, see for example the SAE Aerospace Material Specification 1424G (AMS 1424G).

Typically a type I fluid will have a holdover time of not less than three minutes (180 s) according to the water spray endurance test procedure (WSET) as set out in the SAE Standards document number AS5901 entitled "Water Spray and High Humidity Endurance Test Methods for SAE AMS 1424 and SAE AMS 1428 Aircraft Deicing/Anti-Icing Fluids)".

The upper limit for the holdover time is simply the limits of the particular fluid used. The holdover time is ideally as long as possible but typically the holdover time for a type I fluid measured under the conditions above will be no more than 15 mins, more typically no more than 10 mins and usually no more than 5 minutes (300 seconds)).

Preferably the composition of the present invention is substantially free of a thickening agent. By substantially free of a thickening agent is meant that any thickening agent is present in the composition only in trace amounts.

A type I fluid will typically have substantially Newtonian viscosity. A fluid with substantially Newtonian viscosity has a viscosity which is dependent on temperature and pressure, but is not substantially dependent on the forces acting on the fluid.

A type I de-/anti-icer used in the present invention preferably comprises 1,3-propylene glycol, one or more surfactants, one or more corrosion inhibitors, one or more pH regulators and water. A type II, III or IV fluid contains, in addition, one or more thickeners.

In one embodiment of the invention directed to a type I fluid, the composition comprises, based on the total weight of the de-/anti-icer: 50-97 wt % of 1,3-propylene glycol; 0.01-1.0 wt % of one or more surfactants; 0.01-1.0 wt % of one or more corrosion inhibitors; one or more pH regulators in quantities such that the pH of the composition is 6.5-11; and water; more preferably: 80-95 wt % of 1,3-propylene glycol; 0.1-0.5 wt % of one or more non-ionic and/or anionic surfactants; 0.1-0.5 wt % of one or more corrosion inhibitors; one or more pH regulators in quantities such that the pH of the composition is 7.5-10; and water. The composition is preferably substantially free of thickening agent.

In another embodiment of the invention, the composition is a type II, III or IV de-/anti-icer and comprises, based on the total weight of the de-/anti-icer: 30-70 wt % of 1,3-propylene glycol; 0.1-1.5 wt % of one or more thickeners; 0.01-1.0 wt % of one or more non-ionic and/or anionic surfactants; 0.01-1.0 wt % of one or more corrosion inhibitors; one or more pH regulators in quantities such that the pH of the composition is 6-10; and water; more preferably: 45-55 wt % of 1,3-propylene glycol; 0.2-0.6 wt % of one or more thickeners; 0.1-0.5 wt % of one or more non-ionic and/or anionic surfactants; 0.1-0.5 wt % of one or more corrosion inhibitors; one or more pH regulator in quantities such that the pH of the composition is 7-8; and water.

At least one of the one or more thickeners may be water-swellable or water-soluble thickeners, such as carboxypolymethylene, polyacrylic acid, polysaccharides such as modified starches xanthan gum, and cellulose ether; preferably carboxypolymethylene or polyacrylic acid.

In addition, the present invention provides the use of a composition comprising a mixture of 1,2 propylene glycol with 1,3-propylene glycol.

In addition, the present invention provides the use of a composition comprising a mixture of ethylene glycol and/or diethylene glycol with 1,3-propylene glycol.

By way of an example, a type I de-/anti-icer may be prepared by mixing the components of the following formulation:

80 wt % 1,3-propylene glycol 0.25 wt % surfactant 0.25 wt % corrosion inhibitor pH regulator in quantities such that the pH of the composition is 9 balance water

A type II de-/anti-icer may be prepared by mixing the components of the following formulation:

50 wt % 1,3-propylene glycol 0.3 wt % thickener 0.25 wt % surfactant 0.25 wt % corrosion inhibitor pH regulator in quantities such that the pH of the composition is 7 balance water

The physical properties of 1,2- and 1,3-propylene glycol have been investigated. Table 1 and Table 2 show comparisons of the freezing point data for a 1,3-propylene glycol (PDO)-containing type I fluid and a 1,2-propylene glycol (MPG)-containing type I fluid obtained by two separate experimental procedures. The freezing point is determined according to ASTM D 1177 (freezing point of aqueous engine coolants). The undiluted formulations contain 80% by weight of the propylene glycol as identified in the table. The diluted fluid mixtures are made by volume with ASTM 1193 Type IV water.

TABLE 1

| Type I fluid | Freezing point data (° C.) | |
|---|---|---|
| % volume | PDO | MPG |
| 10 | −2.5 | −2.6 |
| 20 | −5.8 | −5.9 |
| 30 | −9.6 | −9.75 |
| 40 | −14.5 | −14.75 |
| 50 | −21 | −21.5 |
| 60 | −28 | −30 |
| 70 | −43 | −45 |
| 80 | Does not freeze | Does not freeze |

TABLE 2

| Type I fluid | Freezing point data (° C.) | |
|---|---|---|
| % volume | PDO | MPG |
| 10 | −2.5 | −2.6 |
| 20 | −5.8 | −5.9 |
| 30 | −9.8 | −9.75 |
| 40 | −14.8 | −14.75 |
| 50 | −21.5 | −21.5 |
| 60 | −30.1 | −30 |
| 70 | −45.1 | −45 |
| 80 | Does not freeze | Does not freeze |

Table 3 shows a comparison of WSET values for a PDO-containing type I fluid and a MPG-containing type I fluid. The water spray endurance test (WSET) is described in AS 5901, water spray and high humidity endurance time test methods for SAE AMS 1424 and SAE AMS 1428 aircraft ground de-icing/anti-icing fluids. The formulations contain 80% by weight of the propylene glycol. The diluted fluid mixtures are made with hard water. The hard water is prepared as follows: dissolve 400 mg±5 calcium acetate dihydrate ($Ca(C_2H_3O_2)_2$ $2H_2O$) or 363 mg±5 acetate monohydrate ($Ca(C_2H_3O_2)_2 \cdot H_2O$) and 280 mg±5 magnesium sulphate heptahydrate ($MgSO_4 \cdot 7H_2O$), both of analytical reagent quality, in 1 liter of ASTM D 1193, Type IV, water.

TABLE 3

| Type I fluid | WSET values (min) | |
|---|---|---|
| % volume (d) | PDO | MPG |
| 100 | 5 | 5 |
| 69 | 5½ | 6 |
| 50 | 6 | 6 |

Table 4 shows the viscosities at varying temperatures of type I de-/anti-icers containing 80 wt % 1,3-propylene glycol and 80 wt % 1,2-propylene glycol. The viscosities are determined using a Brookfield LVTD viscometer, LV2 spindle at 30 rpm.

TABLE 4

| Temperature | Viscosity (mPas) | |
|---|---|---|
| (° C.) | PDO | MPG |
| 0 | 60 | 100 |
| −10 | 100 | 180 |
| −20 | 180 | 490 |
| −30 | 410 | 1480 |

Tables 1, 2 and 3 show that the freezing points and WSETs of compositions containing various amounts of 1,2- and 1,3-propylene glycol are almost identical for these two propylene glycols. However, Table 4 shows that they have markedly different viscosity profiles. Even at −30° C. the viscosity of the composition containing 1,2-propylene glycol (1480 mPas) is far greater than that containing 1,3-propylene glycol (410 mPas).

The consequences of this increased viscosity on aerodynamic flow off properties is shown in FIGS. 1 and 2. The boundary layer displacement thickness (BLDT) of a de-/anti-icer is a measure of its aerodynamic acceptability—the higher the BLDT, the lower the aerodynamic acceptability. FIGS. 1 and 2 shows the relative BLDT values of type I de-/anti-icers containing 1,3-propylene glycol and 1,2-propylene glycol. The value for 1,3-propylene glycol has been found to increase far more slowly as temperature decreases than does the value for 1,3-propylene glycol, and, consequently, it has been found that 1,3-propylene glycol can be used at much lower temperatures. The BLDT was determined according to AS 5900, the standard test method for aerodynamic acceptance of SAE AMS 1424 and SAE AMS 1428 aircraft de-icing/anti-icing fluids.

The present invention provides the use of a composition as defined herein at temperatures below −32° C., preferably below −35° C. and most preferably below −40° C. The minimum temperature is less critical but is preferably −45° C., more preferably −42° C., or above. The temperature relates to the ambient temperature when the composition is applied. The lowest temperature at which a de-/anti-icer may be used is determined by a combination of the de-/anti-icer's ability to depress the freezing point of water, and the de-/anti-icer's aerodynamic acceptability (as described in ARP 4737 Aircraft De-icing/Anti-icing Methods with Fluids) at this temperature. Due to the improved aerodynamic performance of PDO, the de-/anti-icing composition of the present invention may be used at lower temperatures than de-/anti-icers in which the only glycol present is MPG. As indicated above, the compositions according to the present invention may be used down to a minimum temperature of −45° C., more preferably −42° C. The lower use temperatures are determined where the BLDT against temperature plot crosses the acceptance criterion line, at which value of the BLDT is unacceptable (see FIG. 2).

FIG. 3 shows the relative BLDT values for Type II de-/anti-icers containing, 1,3-propylene glycol, 1,2-propylene glycol and a 50/50 mixture of the 1,3-propylene glycol and 1,2 propylene glycol. The lowest BLDT values were found for 1,3-propylene glycol, the next lowest for a 50/50 mixture of 1,3-propylene glycol and 1,2 propylene glycol, and the highest values for the 1,2 propylene glycol throughout the temperature range from 0° C. to −30° C.

The invention claimed is:

1. A method for removing frozen water and/or for preventing the formation of frozen water on surfaces of an aircraft, said method comprising the steps of:

applying to the surfaces of an aircraft a composition comprising 1,3-propylene glycol, one or more surfactants, one or more corrosion inhibitors, one or more pH regulators, and water, wherein said composition is applied to the surfaces of an aircraft at a temperature below −32° C. for removing frozen water and/or preventing the formation of frozen water on the surfaces of the aircraft, and wherein said composition is a type I de-/anti-icer.

2. The method of claim 1, wherein the temperature is below −35° C.

3. The method of claim 1, wherein the temperature is −42° C. or above.

4. The method of claim 1, wherein the composition comprises:
- 50-97% wt % of 1,3-propylene glycol;
- 0.01-1.0 wt % of the one or more surfactants;
- 0.01-1.0 wt% of the one or more corrosion inhibitors;
- one or more pH regulators in quantities such that the pH of the composition is 6.5-11;
- and water.

5. The method of claim 1, wherein the composition comprises a mixture of 1,2-propylene glycol and 1,3-propylene glycol.

6. The method of claim 1, wherein the composition comprises a mixture of ethylene glycol and/or diethylene glycol with 1,3-propylene glycol.

7. The method of claim 1, wherein the composition is a Newtonian fluid.

8. The method of claim 1, wherein a temperature of the composition is about 65° C. to 80° C. when applied to the surface of the aircraft.

* * * * *